United States Patent
Kimura et al.

[11] Patent Number: 6,155,593
[45] Date of Patent: *Dec. 5, 2000

[54] AIR BAG APPARATUS FOR SEAT OF VEHICLE

[75] Inventors: Masato Kimura; Yukisada Sunabashiri, both of Kanagawa-ken, Japan

[73] Assignee: Nissan Motor Co., Ltd., Kanagawa-ken, Japan

[*] Notice: This patent is subject to a terminal disclaimer.

[21] Appl. No.: 09/011,262

[22] PCT Filed: May 26, 1997

[86] PCT No.: PCT/JP97/01763

§ 371 Date: Jun. 3, 1998

§ 102(e) Date: Jun. 3, 1998

[87] PCT Pub. No.: WO97/45297

PCT Pub. Date: Dec. 4, 1997

[30] Foreign Application Priority Data

May 31, 1996 [JP] Japan .................................. 8/139330
May 31, 1996 [JP] Japan .................................. 8/139331

[51] Int. Cl.[7] ............................ B60R 21/20; B60R 21/22
[52] U.S. Cl. ..................................... 280/728.2; 280/730.2
[58] Field of Search .......................... 280/730.2, 730.1, 280/728.2, 728.3

[56] References Cited

U.S. PATENT DOCUMENTS

| | | | |
|---|---|---|---|
| 5,547,214 | 8/1996 | Zimmerman, II et al. ......... | 280/730.2 |
| 5,639,111 | 6/1997 | Spencer et al. .................... | 280/730.2 |
| 5,651,582 | 7/1997 | Nakano .............................. | 280/730.2 |
| 5,845,932 | 12/1998 | Kimura et al. .................... | 280/730.2 |
| 5,944,341 | 8/1999 | Kimura et al. .................... | 280/730.2 |

FOREIGN PATENT DOCUMENTS

| | | |
|---|---|---|
| 0 768 216 | 4/1997 | European Pat. Off. . |
| 4-050052 | 2/1992 | Japan . |
| 2 296 476 | 7/1996 | United Kingdom . |

*Primary Examiner*—Peter C. English
*Attorney, Agent, or Firm*—McDermott, Will & Emery

[57] ABSTRACT

An air bag apparatus for a seat of a vehicle according to the present invention has a side bracket disposed in the outer portion of a seat back in the widthwise direction of the vehicle and secured to a seat back frame and an air bag module attached to the side bracket. The seat back has a side pad portion in the outer portion in the widthwise direction of the vehicle, while the air bag module has an inflator for generating gas and an air bag body arranged to be unfolded in the forward direction by the gas generated by the inflator. The air bag module is structured to allow deformation of the side pad portion depressed by a person who sits on the seat. Therefore, even if the side pad portion of the seat back is pressed rearwards, satisfactory rearward deformation of the side bracket portion is permitted. Thus, the cushioning characteristic of the side pad portion is not inhibited and comfort sitting feeling can be obtained.

19 Claims, 5 Drawing Sheets

AIR BAG APPARATUS FOR SEAT OF VEHICLE

TECHNICAL FIELD

The present invention relates to an air bag apparatus for a seat of a vehicle for protecting a person (an occupant) who is sitting on a seat such that an air bag provided for a seat back is unfolded when a side collision of the vehicle has taken place.

BACKGROUND ART

Hitherto, a variety of air bag apparatuses have been suggested as disclosed in, for example, Japanese Patent Laid-Open No. 4-50052 in order to prevent a direct shock which is generated between the side wall of a car body, for example, a door, which is deformed attributable to the impact load and a person who is sitting on a seat if a vehicle encounters a side collision.

In general, an air bag apparatus of the foregoing type has a panel-shape side bracket extending forwards and secured to a seat back frame disposed in an outer portion of a seat back in the widthwise direction of the vehicle. Moreover, an air bag module including an air bag body and an inflator is attached to the side bracket. If a collision of the vehicle takes place, gas generated by the inflator causes the air bag body to be unfolded forwards in front of the seat back so that the passenger is protected.

However, the above-mentioned conventional technology having the structure in which the side bracket, to which the air bag module is attached, is formed into a panel-like shape extending forwards has a risk that the cushioning characteristic of a side pad portion is inhibited because the rear surface of the side pad portion comes in contact with the front end of the side bracket if the side pad portion of the seat back is pressed rearwards by the back of the passenger. As a countermeasure against the above-mentioned problem, it might be considered feasible to shorten the length of the side bracket in the lengthwise direction. However, it leads to a fact that the rigidity of the attached air bag module deteriorates unintentionally.

DISCLOSURE OF INVENTION

In view of the foregoing, according to the present invention, there is provided an air bag apparatus for a seat of a vehicle with which the cushioning characteristic of a side pad portion is not inhibited and a comfortable sitting feeling can be obtained.

In order to achieve the above-mentioned object, according to one aspect of the present invention, there is provided an air bag apparatus for a seat of a vehicle comprising a side bracket disposed in the outer portion of a seat back in the widthwise direction of the vehicle and secured to a seat back frame and an air bag module attached to the side bracket, wherein the seat back has a side pad portion in the outer portion in the widthwise direction of the vehicle, the air bag module has an inflator for generating gas and an air bag body arranged to be unfolded in the forward direction by the gas generated by the inflator, and the air bag module is structured to allow deformation of the side pad portion depressed by a person who sits on the seat.

Since the air bag module of the above-mentioned structure is formed to permit deformation of the side pad portion pressed by a person who is sitting on the seat, the side pad portion cannot easily come in contact with the air bag module even if the side pad portion is strongly pressed in the rearward direction by the back of the person who is sitting on the seat. Therefore, the cushioning characteristic of the side pad portion is not inhibited by the air bag module and thus the person who is sitting on the seat is able to obtain comfort sitting feeling.

The side bracket may have a side panel disposed in the rear of the side pad portion and structured to extend in the lengthwise direction and a rear panel disposed in the inside portion of the side panel in the widthwise direction of the vehicle and structured to extend in the widthwise direction of the vehicle, and the inflator may be disposed adjacent to the rear panel of the side bracket.

Since the above-mentioned structure is formed such that the inflator is disposed adjacent to the rear panel in place of the disposition adjacent to the side panel in the rear of the side pad portion, a large space can be provided in the rear of the side pad portion because of the exclusion of the inflator. Therefore, rearward deformation of the side pad portion is satisfactorily permitted and thus the person who is sitting on the seat is able to obtain comfort sitting feeling.

Since the inflator is disposed adjacent to the rear panel of the side bracket, projection of the air bag module, which is the side portion of the seat back, to the outer portion in the widthwise direction of the vehicle can be prevented. That is, since the metal inflator among the elements of the air bag module which easily projects to the outer portion in the widthwise direction of the vehicle when the air bag module is disposed in the outer portion of the widthwise direction of the vehicle is disposed adjacent to the rear panel of the side bracket, the amount of projection of the side portion of the seat back to the outer portion in the widthwise direction of the vehicle can be reduced. Therefore, the gap between the side portion of the seat back and the side wall of the car body can be enlarged so that the seat is easily be mounted on the car body.

The air bag module may be attached to the rear panel.

Since the above-mentioned structure is formed such that the air bag module is attached to the rear panel of the side bracket, mounting of the air bag module is performed from a rear position of the seat back. Therefore, the efficiency to mount the air bag module can be improved as compared with a case in which the same is mounted from a side position of the seat back.

The air bag body may be disposed adjacent to the side panel of the side bracket.

Since the above-mentioned structure is formed such that the air bag body among the elements of the air bag module is disposed adjacent to the side panel of the side bracket, the air bag body can reliably be unfolded in the forward direction. Even if the air bag body is disposed adjacent to the side panel, the soft air bag body can be folded up when accommodated so that projection to the outer portion in the widthwise direction of the vehicle is satisfactorily prevented.

The air bag module may further comprise a base attached to the rear panel of the side bracket, a guide for restricting a direction in which the air bag body is unfolded to a forward direction and a cover for covering the inflator, the air bag body and the guide, and the cover may have, at the leading end thereof, a tag structured to be split and opened when the air bag body is unfolded.

Since the above-mentioned structure is formed such that the air bag module has the guide for restricting the direction in which the air bag body is unfolded to the forward direction and the cover having, at the leading end thereof, the tag which is split when the air bag body is unfolded, the air bag body can more reliably be unfolded.

The inflator may have a cylindrical shape and disposed to be stood erect at a position in the rear of the seat back frame.

Since the above-mentioned structure causes only the side rear portion (the rear portion of the seat back frame) of the seat back to be projected rearwards because the inflator is provided and thus the central portion of the rear surface of the seat back is not projected rearwards by the inflator, a satisfactorily large front clearance can be maintained for a passenger on the rear seat.

The base may be formed to have a substantially L-shape cross section, and the seat back frame may be disposed in the inner portion of an L-shape corner.

The above-mentioned structure causes reaction (reaction from the inflator to the base) generated when the air bag body is unfolded to effectively be transmitted to the seat back frame through the base having a substantially L-shape base.

The leading end of the base may be inclined not to be in contact with the rear surface of the side pad portion which is deformed when pressed in the rearward direction.

Since the above-mentioned structure is formed such that the front end portion of the base is inclined in a direction in which it does not interfere with the rear surface of the side pad portion which is deformed when pressed rearwards, the rear surface of the side pad portion does not easily come in contact with the front end portion of the base even if the side pad portion is pressed rearwards by the pressure of the back of the person who is sitting on the seat. Thus, satisfactorily great rearward deformation of the side bracket portion is permitted. Thus, the cushioning characteristic of the side pad portion is not inhibited. Even if the contact takes place, the structure, in which the front end portion is inclined, causes a large area of the rear surface of the side pad portion to be brought into contact with the front end portion. Thus, the cushioning characteristic does not considerably deteriorate. Therefore, the person who is sitting on the seat is able to obtain comfort sitting feeling.

Another structure may be employed in which the side bracket has a side panel disposed in the rear of the side bag portion and structured to extend in the lengthwise direction and a rear panel disposed in the inner portion of the side panel in the widthwise direction of the vehicle and structured to extend in the widthwise direction of the vehicle, the air bag module further comprises a base having a rear adaptation portion attached to the rear panel of the side bracket and a side adaptation portion structured to be in close contact with the side panel and a cover having a front end which is split when the air bag body is unfolded and made of resin, and the side panel of the side bracket is shorter than the side adaptation portion of the base and the front end of the side adaptation portion projects more forwards than the side panel and inclines to the outer portion in the widthwise direction of the vehicle.

Since the above-mentioned structure is formed such that the side panel of the side bracket is shorter than the side adaptation portion of the base and the front end of the side adaptation portion projecting more forwards than the side panel inclines to the outer portion in the widthwise direction of the vehicle, the rear surface of the side pad portion does not easily come in contact with the front end portion of the base even if the side pad portion is pressed rearwards by the pressure of the back of the person who is sitting on the seat. Thus, satisfactorily great rearward deformation of the side bracket portion is permitted. As a result, the cushioning characteristic of the side pad portion is not inhibited. Even if the contact takes place, the structure, in which the front end portion is inclined, causes a large area of the rear surface of the side pad portion to be brought into contact with the front end portion. Thus, the cushioning characteristic does not considerably deteriorate.

Although the side panel of the side bracket has a short length, the base of the air bag module can reliably be attached to the rear panel of the side bracket. Therefore, weakening of the attached air bag module can be prevented.

The front end of the side adaptation portion may incline at an angle with which the air bag body, which is unfolded, and the corner of the side pad portion do not interfere with each other.

Since the above-mentioned structure is able to prevent interference of the air bag body which is unfolded forwards with the corner of the side pad portion, the air bag body can reliably and stably be unfolded.

The cover may have, at a position adjacent to the front end thereof, a tag attached to the front end of the side adaptation portion of the base, and the tag may have a thin notched portion which can easily be split.

Since the above-mentioned structure is formed such that the tag is disposed in a direction in which the air bag body is unfolded (that is, disposed-in the front portion), the unfolding force of the air bag body directly acts on the notched portion of the tag. Thus, the tag can easily be split.

Since the thin notched portion is provided for the tag, sink generated when the notched portion has been molded from resin does not appear. Thus, satisfactory appearance can be realized. If the notched portion structured to be split is formed on the reverse side of the cover, sink of the molded resin caused from the provided notched portion appears on the surface of the cover. Thus, the appearance deteriorates. However, the present invention having the notched portion provided for the tag which is disposed in a non-visible position is free from a problem of deterioration in the appearance.

The air bag module may further comprise a guide for restricting the direction in which the air bag body is unfolded to the front direction.

Since the above-mentioned structure having the guide provided for the air bag module and capable of restricting the direction in which the air bag body is unfolded to the forward direction, the inflator can be disposed adjacent to the rear panel of the side bracket. Thus, side projection of the side portion of the seat back can be prevented.

BEST MODE FOR CARRYING OUT THE INVENTION

Figure 1:
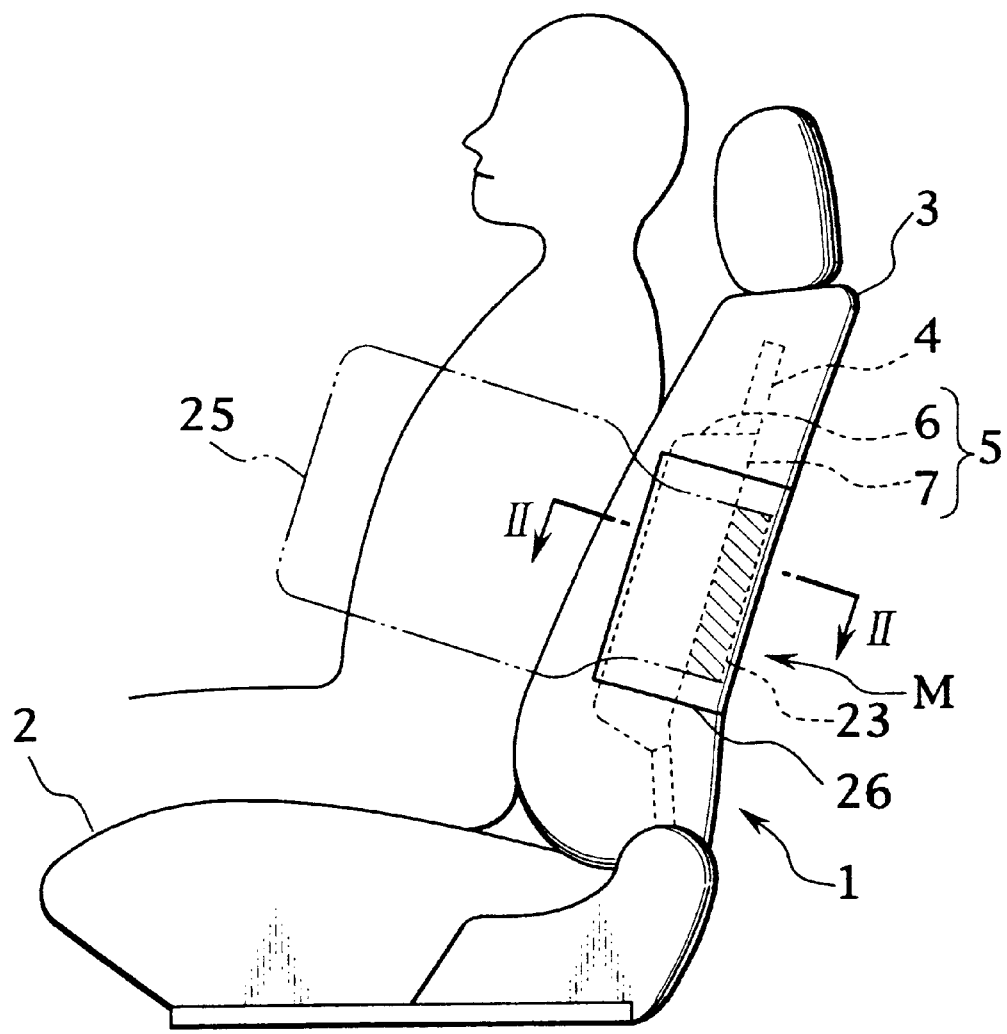
FIG. 1 is a side view of a seat for a vehicle showing an air bag apparatus according to an embodiment of the present invention.

A preferred embodiment of the present invention will now be described with reference to FIGS. 1 to 5. Note that the symbol L shown in the drawings indicates the left-hand side (an outer portion in the widthwise direction of the vehicle) and an R indicates the right-hand side (an inside portion in the widthwise direction of the vehicle).

FIG. 1 shows a left-hand front seat 1 of a vehicle consisting of a seat cushion 2 secured to a floor and a seat back 3 permitted to be inclined forwards. The seat back 3 is provided with a pipe-shape seat back frame 4. The overall shape of the seat back frame 4 is formed into a substantially U-shape facing downwards. A vertical portion of the seat back frame 4 is disposed in each of the right-hand portion and the left-hand portion of the seat back 3.

Figure 2:
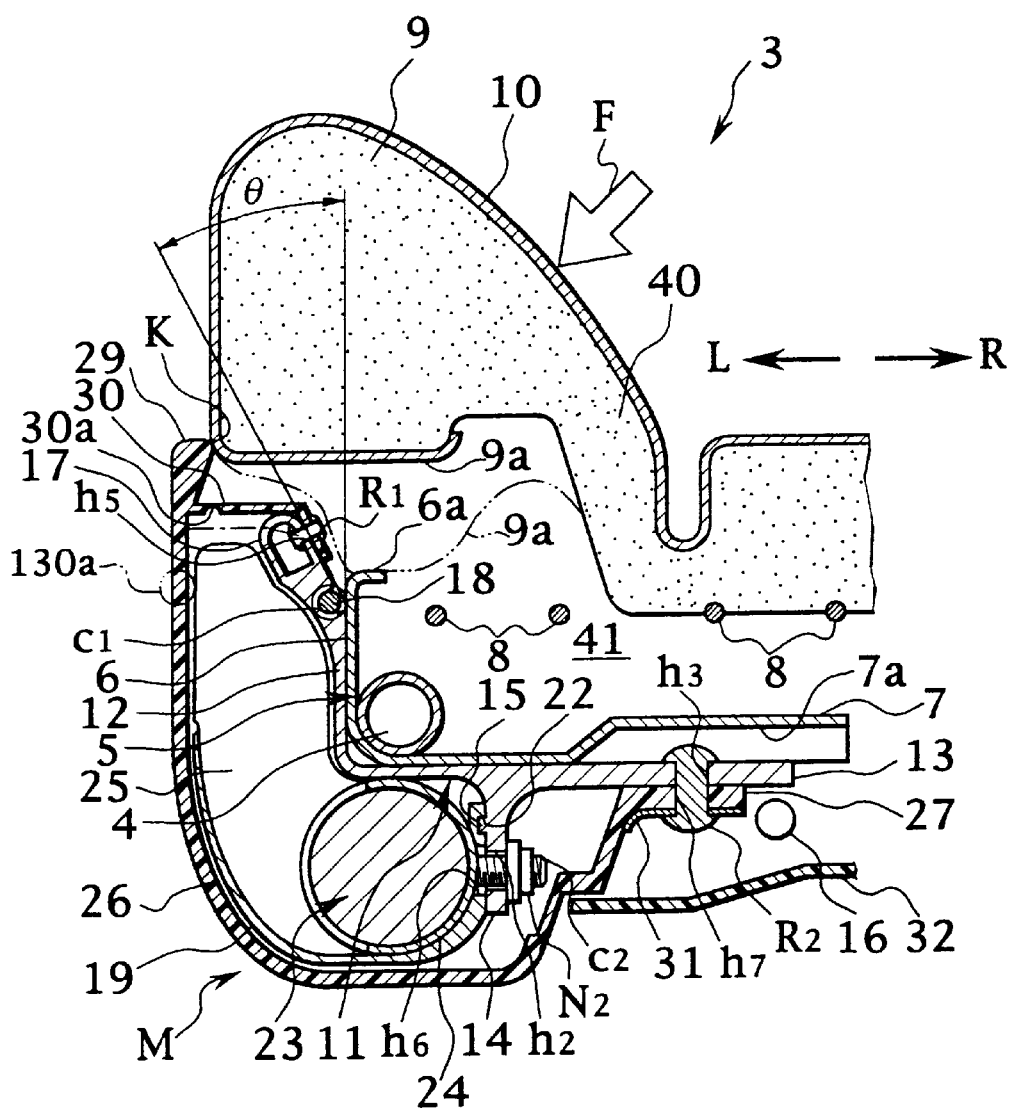
FIG. 2 is a cross sectional view taken along line II—II shown in FIG. 1.
Figure 4:
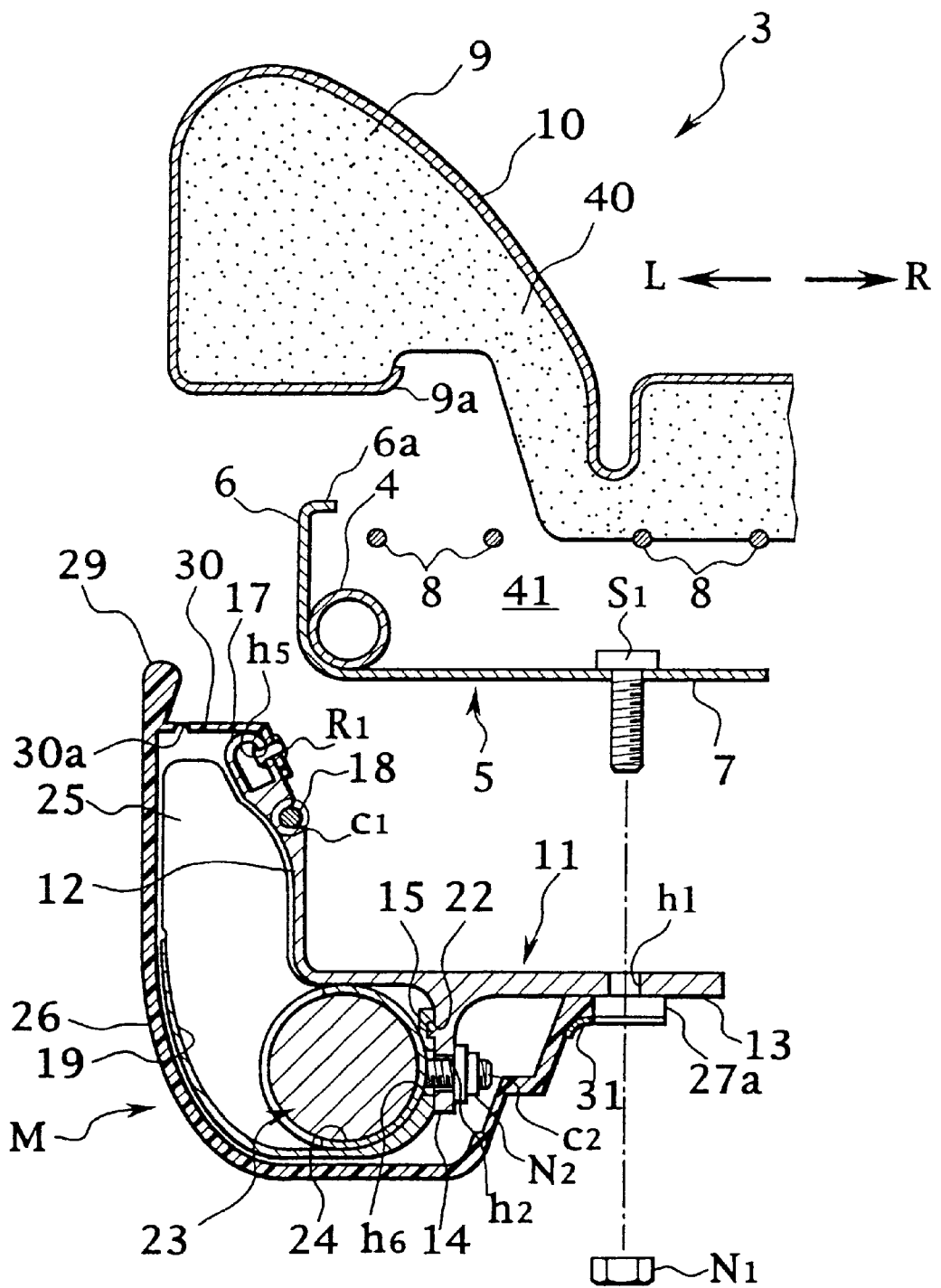
FIG. 4 is a cross sectional view showing a weld bolt portion showing a method of attaching an air bag module.
Figure 5:
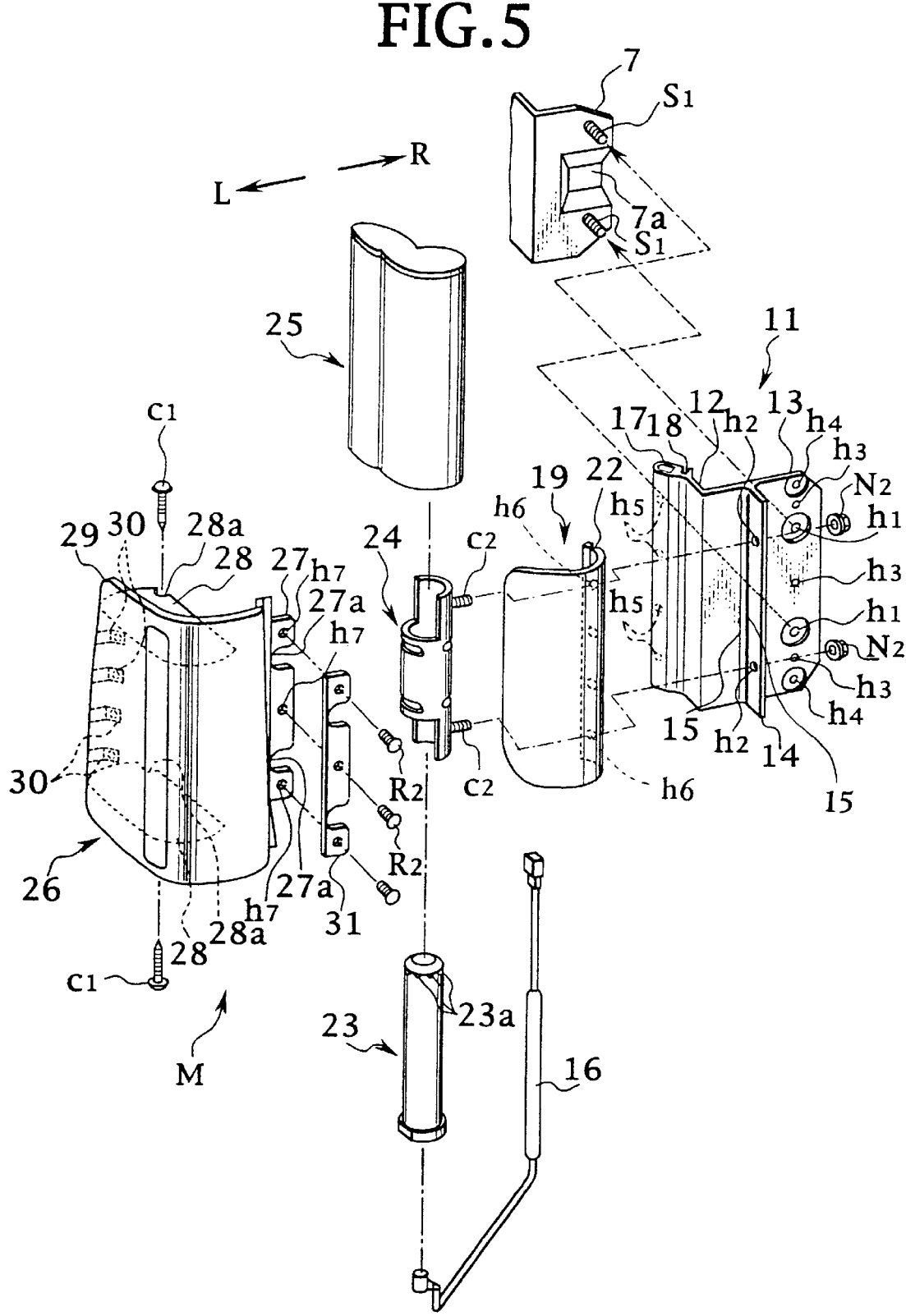
FIG. 5 is an exploded view showing the structure of the air bag module.

As shown in FIG. 2, a side bracket 5 is welded to the left-hand portion (in the outer portion of the widthwise direction of the vehicle) of the seat back frame 4. The side bracket 5 has a substantially L-shape cross section having a side panel 6 extending in the lengthwise direction and a rear panel 7 bent at the rear end of the side panel 6 to extend to the right (to the inner portion in the widthwise direction of the vehicle). The length of the side panel 6 in the lengthwise than the length of the rear panel 7 in the width direction. side panel The side panel 6 has, at the front end thereof, a bent portion 6a. Two weld bolts S1 are vertically disposed at the right-hand end surface of the rear panel 7, as shown in FIGS. 4 and 5. In the central portion of the rear panel 7, there is formed a recess 7a for preventing interference with a rivet R2 to be described later. Between the right and left brackets 5, there are disposed an S-shape seat spring 8 and a lumbar support mechanism (not shown).

Pads 40 cushion the front surface and the side surface of the seat back 3. The pads 40 have a skin 10 provided except for the rear portion. A portion of the pad in the outer portion in the widthwise of the vehicle forms a side pad portion 9 projecting more forward than the central portion of the same. The side panel 6 of the side bracket 5 is disposed in the rear of the side pad portion 9.

A region 41 in which the pads 40 and the skin 10 do not exist is provided for a portion of the seat back 3 around the side bracket 5. The side bracket 5 is exposed over the region 41. An air bag module M is attached to the side bracket 5 exposed in the region 41.

The air bag module M is structured to permit the side pad portion 9 to be deformed when it is pressed by a person who sits on the seat.

The structure of the air bag module M will now be described with reference to FIG. 5.

The air bag module M has a base 11, a guide 19, an inflator 23, an air bag body 25 and a cover 26.

The base 11 is made of an extruded aluminum alloy and has a shape substantially adaptable to the side bracket 5. Since the base 11 is an extruded member, it can easily be used commonly as either the right-hand element or the left-hand element when it is turned upside down.

The base 11 is formed to have a substantially L-shape cross section having a side adaptation portion 12 and a rear adaptation portion 13 and disposed in such a manner that the seat back frame 4 is disposed in the inside portion of the corner of the L-shape portion. The rear adaptation portion 13 is attached to the rear panel 7. The side adaptation portion 12 is in close contact with the side panel 6 in a state where the rear adaptation portion 13 has been attached to the rear panel 7. A rearward projection 14 is formed at an intermediate position of the rear adaptation portion 13. The projection 14 has, on the left-hand surface of the base portion thereof, a projecting portion 15 formed vertically. Two holes h2 are formed vertically adjacent to the projecting portion 15. Two fixing holes h1 corresponding to weld bolts S1 for the side bracket 5 and fixing holes h3 for securing a cover 26 to be described later are formed at the right-hand end of the base 11. Moreover, two clip holes h4 are formed at the right-hand end of the base 11 in addition to the above-mentioned fixing holes h1 and h3. The clip holes h4 are formed to receive inserted fixing clips (not shown) for a harness 16 to be described later.

On the other hand, a leading end 17 of the side adaptation portion 12 of the base 11 is formed into a shape having a hollow cross section and a rounded leading end. The leading end 17 is in a state where it projects more forward than the side panel 6 because the side panel 6 is shortened as described above. The leading end 17 has four holes h5 in the right-hand side surface.

The leading end 17 of the side adaptation portion 12 is inclined in a direction in which interference with a rear surface 9a of the side pad portion 9 which is deformed when pressed rearwards can be prevented and the air bag body 25, which is unfolded, is guided in such a manner that the air bag body 25 does not interfere with a corner K of the side pad portion 9. In this embodiment, the leading end 17 is inclined to the left (to the outer portion in the widthwise direction of the vehicle) by an angular degree of θ from the side panel 6 of the side bracket 5. The angle θ is determined in such a manner that the leading end 17 substantially faces the corner K of the side pad portion 9. A receiving groove 18 for receiving screws C1 to be described later is vertically and continuously formed at the root of the leading end 17. Note that the above-mentioned fixing holes h1 to h5 are formed symmetrically in the vertical direction so as to be commonly used regardless of the right-hand portion or the left-hand portion.

The guide 19 is made of an aluminum alloy and formed to forward restrict the unfolding direction of the air bag body 25. The guide 19 is warped to form a substantially U-shape having a thickness gradually reduced from the base to the leading end thereof. The leading end of the guide 19 has the smallest thickness and formed into a straight shape extending forwards. Elongate holes h6 formed in the lengthwise direction to correspond to holes h2 of the projection 14 are formed in the base portion of the guide 19. A locating groove 22 arranged to be engaged to the projecting portion 15 to locate the holes h2 and h6 each other is formed adjacent to the foregoing base portion. Also the guide 19 is formed by extruding molding similarly to the base 11.

The inflator 23 has a cyclindrical shape and stands in the rear of the seat back frame 4. The inflator 23 has gas jetting holes 23a at the top end thereof. A harness 16 is connected to the lower end of the inflator 23, the harness 16 being secured within the clip holes h4 of the base 11 by a clip (not shown) as described above. Note that the inflator 23 is an inflator of a type in which high pressure gas has been enclosed.

The inflator 23 is secured to the base 11 in a state where it has been inserted into a housing 24. The housing 24 is formed into a cylindrical shape having upper and lower portions which are half cut, the housing 24 having two bolts C2 projecting over the side surface thereof. The bolts C2 are allowed to pass through the holes h6 of the guide-19, and then inserted into the holes h2 of the projection 14 of the base 11 so as to be secured by lock nuts N2. Since each of the holes h6 has the elongated shape, the inflator 23 can easily be inserted deeply into the guide 19.

The air bag body 25 is folded up and accommodated so as to easily be unfolded. Since the air bag body 25 surrounds the inflator 23 and the housing 24, a portion of the air bag body 25 is held between the housing 24 and the base portion of the guide 19. The air bag body 25 extends forwards from the inflator 23 along the side adaptation portion 12 of the base 11.

The cover 26 is made of resin and formed into a curved shape for covering a region from the rear surface of the seat back 3 to the side surfaces of the same. The cover 26 has a base 27 in which three fixing holes h7 are formed to correspond to the fixing holes h3. Moreover, the base 27 has cut portions 27a for exposing the fixing holes h1. Moreover, a flat shape rib 28 is formed in each of the upper and lower portions of the inner surface of cover 26. A cut portion 28a opened to correspond to the receiving groove 18 of the base 11 is formed in the edge portion of each of the ribs 28. It is preferable that the cut portion 28a be formed into a shape having a small opening portion and large inner portion. Moreover, four tags 30 are formed in the front end 29 of the cover 26. A notched portion 30a having a small thickness is formed in the inner portion of the root of the tag 30. Since the tags 30 are formed in the front end 29 of the cover 26, they are located in a direction (that is, in the front portion) in which the air bag body 25 is unfolded.

Therefore, the guide 19, the inflator 23, the housing 24 and the air bag body 25 are attached to the base 11, and then the cut portions 28a formed in the ribs 28 provided for the cover 26 are secured to the receiving groove 18 of the base 11 with screws Cl. Moreover, the tags 30 are, with rivets RI, secured to holes h5 formed in the leading end 17 of the base 11 so that the base 27 is superimposed on the rear adaptation portion 13 and the fixing holes h3 and h7 are aligned to each other. Then, the base 27 and the rear adaptation portion 13 are fixed with rivets R2 through a bracket 31 having the same shape as that of the base 27 of the cover 26. Thus, the air bag module M can be manufactured to serve as a part.

The air bag module M is, from a rear position, attached to the side bracket 5 exposed in the region 41 of the seat back 3 from which the pads 40 and so forth are omitted. That is, the rear adaptation portion 13 and the side adaptation portion 12 of the base 11 of the air bag module M are brought is into close contact with the rear panel 7 and the side panel 6 of the side bracket 5. Moreover, the seat back frame 4 is placed in the inner portion of the corner of the base 11, and then the fixing holes h1 of the air bag module M are aligned to weld bolts SI of the side bracket 5 so as to be fixed with nuts N1. After the air bag module M has been attached, a trim 32 is finally attached to the rear surface of the seat back 3 with a clipping means (not shown).

In a state where the air bag module M has been attached as described above, the inflator 23 in the air bag module M is placed in the rear of the seat back frame 4 of the side bracket 5 facing the rear panel 7 and only the soft air bag body 25 exists in the portion adjacent to the side panel 6. Therefore, the side portion of the seat back 3 does not project to the wall of the body. That is, even if the air bag body 25 is placed adjacent to the side panel 6, side projection of the air bag module M can satisfactorily be prevented when the air bag body 25 is folded up and accommodated because the air bag body 25 is a soft bag. Since also rearward projection of the air bag module M is limited to only the rear portion of the side portion of the seat back 3, a satisfactory large clearance for a passenger on the rear seat can be maintained.

Figure 3:
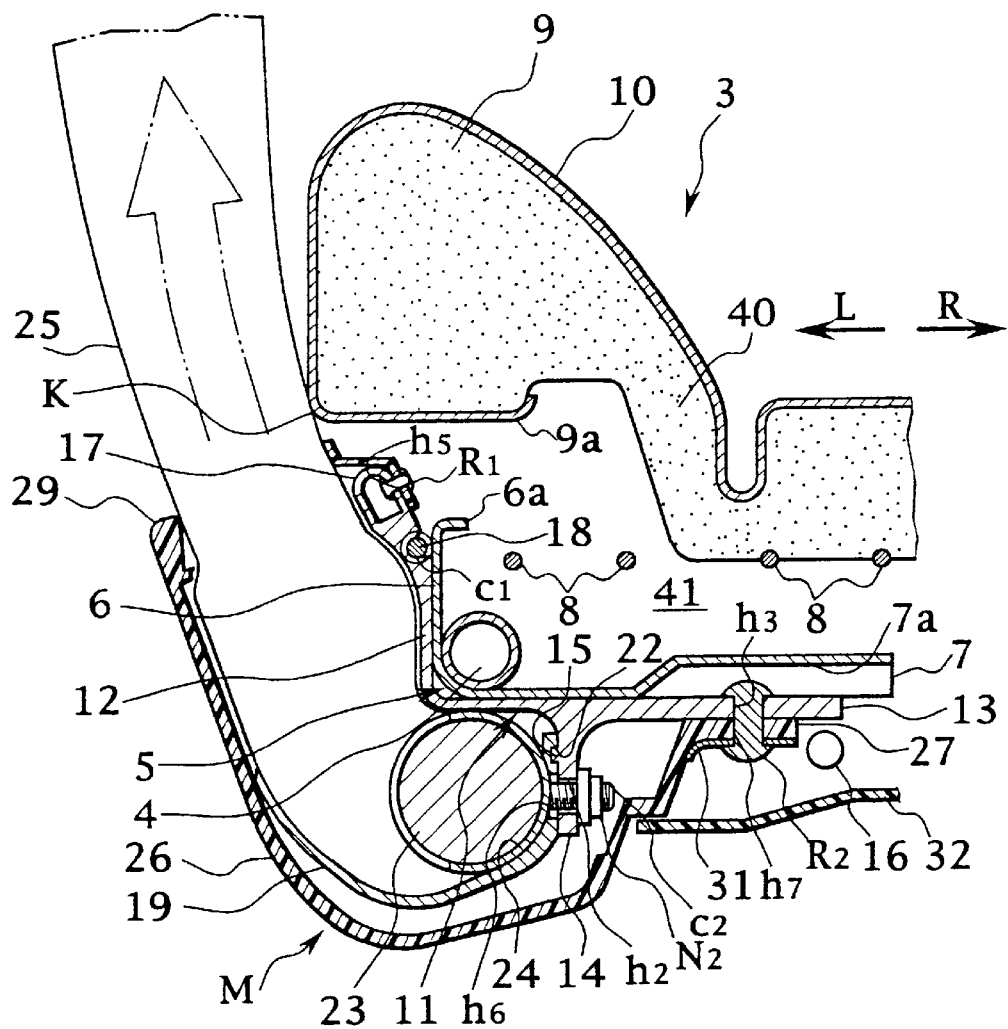
FIG. 3 is a cross sectional view showing a state where the air bag body is unfolded and corresponding to FIG. 2.

A state for unfolding the air bag body 25 will now be described with reference to FIG. 3.

If a collision of the vehicle takes place, a signal denoting this is supplied to the inflator 23 through the harness 16 so that a large quantity of gas is jetted out from the inflator 23.

Since the air bag body 25 is unfolded in the cover 26 attributable to the jetted gas, the unfolding force of the gas splits the notched portions 30a of the tags 30 in the front end 29 of the cover 26. Since the ribs 28 of the cover 26 are secured by the cut portions 28a and the screws C1, the ribs 28 can easily be separated and thus the front end of the cover 26 is opened. When the cover 26 has been opened, the opened cover 26 and the guide 19 restrict the unfolding direction of the air bag body 25 to only the forward direction. Thus, the air bag body 25 is unfolded and expanded at the side position of the seat back 3. Since the guide 19 is deformed to the left attributable to the unfolding force of the air bag body 25, a space between the guide 19 and the base 11 is enlarged. As a result, a space required for the air bag body 25 to be unfolded can be maintained. As a result, the air bag body 25 can reliably be unfolded in the forward direction so that the passenger is protected. Reaction force (reaction force from the inflator 23 to the base 11) generated when unfolding is performed is effectively transmitted to the seat back frame 4 by the base 11 having the substantially L-shape cross section.

Advantages of this embodiment will now be described.
Cushioning Characteristic of Side Pad Portion 9:

Since the inflator 23 is disposed adjacent to the rear panel 7 in place of the disposition adjacent to the side panel 6 in the rear of the side pad portion 9, a space in the rear of the side pad portion 9 can be enlarged because the inflator 23 is excluded. Therefore, even if the side pad portion 9 of the seat back 3 is, as shown in FIG. 2, pressed rearwards with pressure F of the back of a passenger (a person who sits on the seat), satisfactory rearward deformation of the side pad portion 9 is permitted.

Since the side panel 6 is shorter than the side adaptation portion 12 of the base 11 and the leading end 17 of the side adaptation portion 12 projecting more forward than the side panel 6 is inclined to the left by the angular degree of θ, the rear surface 9a (a state where the imaginary line is depressed) of the side pad portion 9 is not easily brought into contact with the leading end 17 of the base 11 even if the side pad portion 9 of the seat back 3 is pressed rearwards with the pressure F of the back of the passenger and thus the side pad portion 9 is considerably deformed in the rearward direction. Therefore, satisfactory rearward deformation of the side pad portion 9 is permitted.

As a result, even if the back of the passenger presses the side pad portion 9, the cushioning characteristic of the side pad portion 9 is not inhibited. Thus, the person who is sitting on the seat is able to obtain comfortable sitting feeling.

Even if the passenger excessively presses the side pad portion 9 and thus the rear surface 9a of the side pad portion 9 is brought into contact with the leading end 17, the structure in which the leading end 17 is inclined to the left causes a wide area of the rear surface 9a to be brought into contact with the leading end 17. Thus, the cushioning characteristic does not considerably deteriorate. Also the structure in which the bent portion 6a is formed at the leading end of the side panel 6 contributes to prevention of deterioration in the cushioning characteristic.
Effect of Preventing Side Projection of Seat Back 3:

Since the inflator 23 of the air bag module M is disposed adjacent to the rear panel 7 of the side bracket 5, side projection of the side portion of the seat back 3 can be prevented. Therefore, the gap between the side portion of the seat back 3 and the side wall (a door or the like) of the car body can be enlarged. As a result, an operation for mounting the left-hand front seat 1 on the car body can easily be performed.

Improvement in Working Efficiency When Air Bag Module M is Attached:

Since the air bag module M is attached to the rear panel 7 of the side bracket 5, the air bag module M is attached from a position in the rear of the seat back 3. Therefore, the working efficiency to attach the air bag module M can be improved as compared with the case where the air bag module M is attached from a side position of the seat back 3. Since the structure is formed such that the air bag module M is fixed to the rear panel 7 with the nuts N1, the operation for attaching the air bag module M can easily be performed. Thus, the working efficiency can be improved.

Rigidity of Attached Air Bag Module M:

Even if the side panel 6 has a short length, the structure which enables the rear adaptation portion 13 of the base 11 of the air bag module M to reliably be attached to the rear panel 7 of the side bracket 5 prevents deterioration in the rigidity of the attached air bag module M.

Stability when Air Bag Body 25 is Unfolded:

Since the inclined leading end 17 faces the corner K of the side pad portion 9, the air bag body 25 does not interfere with the corner K of the side pad portion 9 when the air bag body 25 is unfolded in the forward direction. Thus, the air bag body 25 can reliably and stably be unfolded. Note that the angle θ of the leading end 17 is required to prevent interference with the corner K. The leading end 17 is not required to face the corner K.

Easiness to Split of Cover 25:

Since the tags 30 are located in the direction (in the forward position) in which the air bag body 25 is unfolded, the unfolding force of the air bag body 25 directly acts on the notched portions 30a of the tags 30. Thus, the tags can easily be split.

Improvement in the Appearance of Air Bag Module M:

Since the thin notched portions 30a are formed into the tags 30, sink generated when the notched portions 30 are formed does not appear and thus satisfactory appearance can be realized. If a notched portion 130a is provided for the reverse side of the cover 26, sink of the molded resin caused from the notched portion 130a unintentionally appears on the surface of the cover 26. In this case, the appearance deteriorates.

Effect to Prevent Side Projection of Side Portion of Seat Back 3:

Since the guide 19 provided for the inside portion of the air bag module M is able to restrict the direction in which the air bag body 25 is unfolded into the forward direction, the inflator 23 can be attached to the side bracket 5 of the rear panel 7. Thus, the length of side projection of the air bag module M can be reduced. As a result, the gap between the side portion of the seat back 3 and the side wall (the door or the like) of the car body can be enlarged. Thus, the left-hand front seat 1 can easily be mounted on the car body.

Obtaining Clearance in Front of Passenger on the Rear Seat:

Since the inflator 23 is formed into a cylindrical shape and disposed in the rear of the seat back frame 4 to be stood erect, only the side rear portion (the rear portion of the seat back frame 4) of the rear portion of the seat back 3 is projected attributable to the provision of the inflator 23. Therefore, the central portion of the rear surface of the seat back 3 is not projected rearwards by the inflator 23. Thus, a satisfactory large clearance can be obtained in front of the passenger on the rear seat.

What is claimed is:

1. An air bag apparatus for a seat of a vehicle comprising
    a side bracket disposed in an outer portion of a seat back in a widthwise direction of the vehicle and secured to a seat back frame; and
    an air bag module attached to said side bracket,
    wherein said seat back has a side pad portion in the outer portion in the widthwise direction of the vehicle,
    wherein said air bag module is disposed rearwardly of said side pad portion and has an inflator for generating gas and an air bag body arranged to be unfolded forwardly by gas generated by said inflator, and
    wherein said air bag module and said side pad portion define a space that allows deformation of said side pad portion when depressed by a person on the seat.

2. An air bag apparatus for a seat of a vehicle according to claim 1, wherein
    said side bracket has a side panel and a rear panel,
    said side panel is disposed rearwardly of said side pad portion and extends in a lengthwise direction of the vehicle,
    said rear panel extends inwardly from said side panel in the widthwise direction of the vehicle, and
    said inflator is disposed adjacent to said rear panel of said side bracket.

3. An air bag apparatus for a seat of a vehicle according to claim 2, wherein
    said air bag module is attached to said rear panel.

4. An air bag apparatus for a seat of a vehicle according to claim 2, wherein
    said air bag body is disposed adjacent to said side panel of said side bracket.

5. An air bag apparatus for a seat of a vehicle according to claim 2, wherein
    said air bag module further comprises a base attached to said rear panel of said side bracket, a guide for restricting an expanding direction of said air bag body forwardly and a cover for covering said inflator, said air bag body and said guide, and
    said cover has, at a leading end thereof, a tag structured to be split and opened when said air bag body is unfolded.

6. An air bag apparatus for a seat of a vehicle according to claim 5, wherein
    said inflator has a cylindrical shape and is disposed to be stood erect at a position rearwardly of said seat back frame.

7. An air bag apparatus for a seat of a vehicle according to claim 5, wherein
    said base is formed to have a substantially L-shaped cross section with a corner, and said seat back frame is disposed inside the corner.

8. An air bag apparatus for a seat of a vehicle according to claim 1, wherein
    said air bag module further comprises a base, and
    a leading end of said base projects more forwardly than said side bracket and is inclined so as not to be in contact with a rear surface of said side pad portion which is deformed when pressed rearwardly.

9. An air bag apparatus for a seat of a vehicle according to claim 1, wherein
    said side bracket has a side panel and a rear panel,
    said side panel is disposed rearwardly of said side pad portion and extends in a lengthwise direction of the vehicle, said rear panel extends inwardly from said side panel in the widthwise direction of the vehicle, said air bag module further comprises a base and a resin cover, said base has a rear adaptation portion attached to said rear panel of said side bracket and a side adaptation portion which is in close contact with said side panel, said cover has a front end which is split when said air bag body is unfolded, and said side panel of said side bracket is shorter than said side adaptation portion of said base and a front end of said side adaptation portion projects more forwards than said side panel and inclines outwardly in the widthwise direction of the vehicle.

10. An air bag apparatus for a seat of a vehicle according to claim 9, wherein the front end of said side adaptation portion inclines at an angle such that the air bag body, which is unfolded, and a corner of said side pad portion do not interfere with each other.

11. An air bag apparatus for a seat of a vehicle according to claim 9, wherein said cover has, at a position adjacent to the front end thereof, a tag attached to the front end of said side adaptation portion of said base, and said tag has a thin notched portion which can easily be split.

12. An air bag apparatus for a seat of a vehicle according to claim 9, wherein said air bag module further comprises a guide for restricting an expanding direction of said air bag body forwardly.

13. An air bag apparatus for a vehicle seat, comprising:

a side bracket disposed in an outer portion of a seat back in a widthwise direction of the vehicle and secured to a seat back frame; and an air bag module attached to the side bracket, wherein the seat back has a side pad portion in the outer portion in the widthwise direction of the vehicle, the air bag module has an inflator for generating gas and an air bag body arranged to be unfolded forwardly by gas generated by the inflator, the air bag module is structured to allow deformation of the side pad portion when depressed by a person on the seat, the side bracket has a side panel disposed rearwardly of the side pad portion and extending in a lengthwise direction of the vehicle and a rear panel disposed inwardly of the side panel in the widthwise direction of the vehicle and structured to extend in the width direction of the vehicle, and the inflator is disposed adjacent to the rear panel of the side bracket.

14. An air bag apparatus for a vehicle seat according to claim 13, wherein the inflator is attached to the rear panel.

15. An air bag apparatus for a vehicle seat according to claim 14, wherein the inflator is disposed rearwardly of the seat back frame with the rear panel arranged between the inflator and the seat back frame.

16. An air bag apparatus for a vehicle seat, comprising:

a side bracket disposed in an outer portion of a seat back in a widthwise direction of a vehicle and secured to a seat back frame; and an air bag module attached to the side bracket, wherein the seat back has a side pad portion in the outer portion in the widthwise direction of the vehicle, the air bag module has an inflator for generating gas, an air bag body arranged to be unfolded forwardly by gas generated by the inflator, and a base supporting the inflator and the air bag body, and a leading end of the base projects more forwardly than the side bracket and is inclined so as not to be in contact with a rear surface of the side pad portion which is deformed when pressed rearward, wherein the base is formed to have a substantially L-shaped cross section with a side and a rear, and wherein the inflator is attached to the rear of the base.

17. An air bag apparatus for a vehicle seat, comprising:

a side bracket disposed in an outer portion of a seat back in a widthwise direction of the vehicle and secured to a seat back frame; and an air bag module attached to the side bracket, wherein the seat back has a side pad portion in the outer portion in the widthwise direction of the vehicle, the air bag module has an inflator for generating gas and an air bag body arranged to be unfolded forwardly by gas generated by the inflator, the air bag module is structured to allow deformation of the side pad portion when depressed by a person on the seat, the side bracket has a side panel disposed rearwardly of the side pad portion and structured to extend in a length direction of the vehicle and a rear panel disposed inwardly in the widthwise direction of the vehicle and extending in the widthwise direction of the vehicle, the air bag module further comprises a base having a rear adaptation portion attached to the rear panel of the side bracket and a side adaptation portion structured to be in close contact with the side panel and a resin cover having a front end that splits when the air bag body is unfolded, the side panel of the side bracket is shorter than the side adaptation portion of the base and a front end of the side adaptation portion projects more forwardly than the side panel and inclines outwardly in the widthwise direction of the vehicle.

18. An air bag apparatus for a vehicle seat according to claim 17, wherein the air bag module further comprises a guide that prevents the air bag body from expanding in a rearward direction of the vehicle.

19. An air bag apparatus for a vehicle seat according to claim 19, wherein the guide and a corresponding side of the base define a space, and the space is enlarged when the air bag body unfolds.

* * * * *